H. R. KENNEDY.
FENDER RIM AND WIRED EDGE TOOL AND THE LIKE.
APPLICATION FILED MAR. 4, 1920.
1,427,299.
Patented Aug. 29, 1922.
3 SHEETS—SHEET 1.
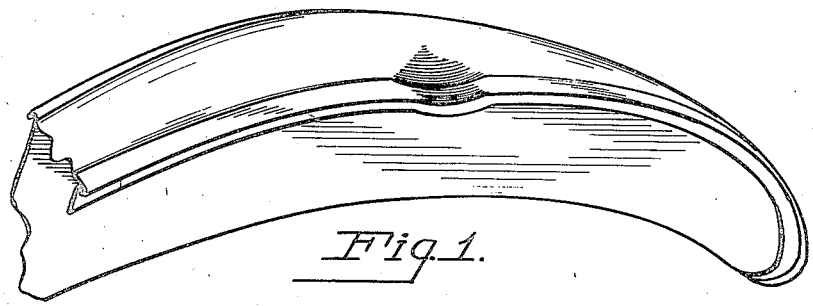
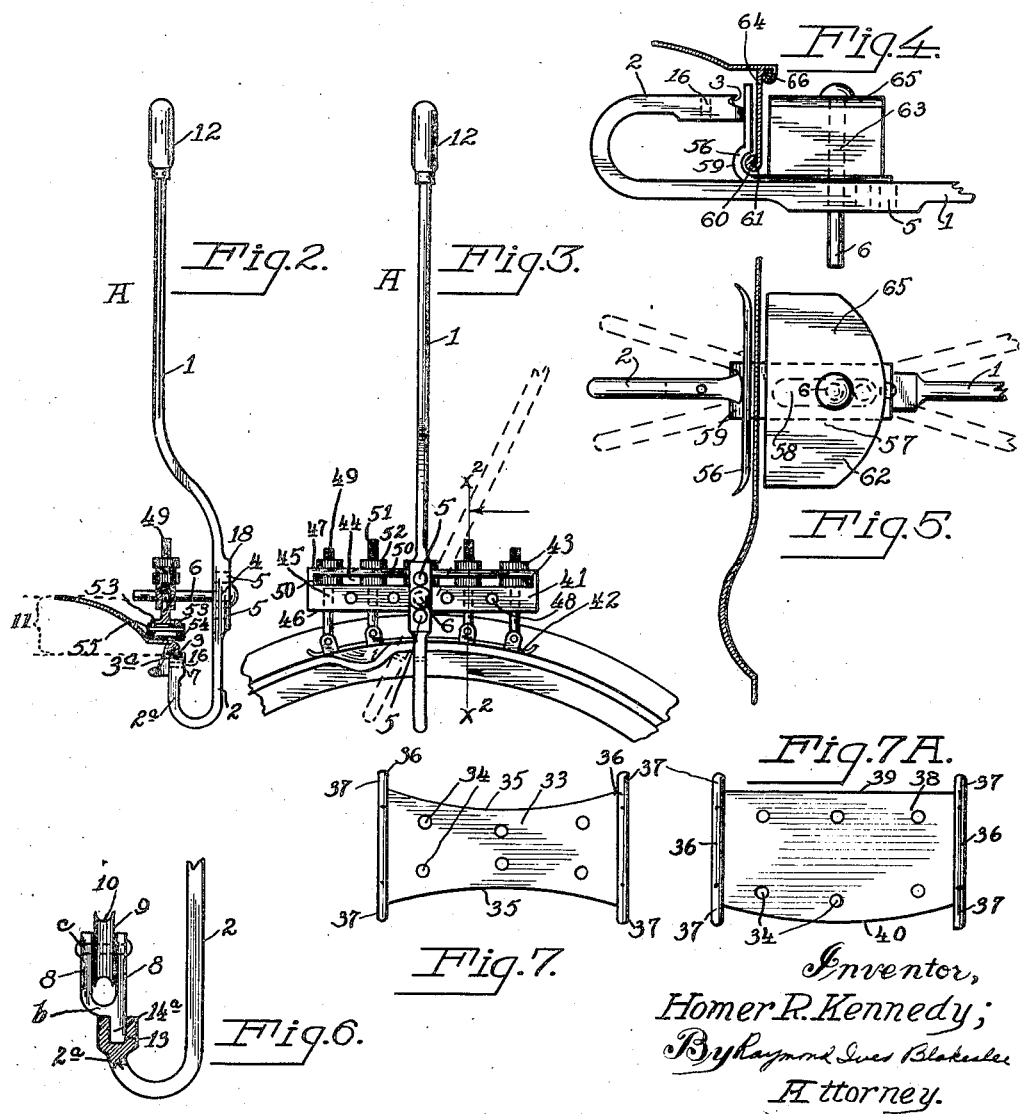

H. R. KENNEDY.
FENDER RIM AND WIRED EDGE TOOL AND THE LIKE.
APPLICATION FILED MAR. 4, 1920.
1,427,299.
Patented Aug. 29, 1922.
3 SHEETS—SHEET 2.
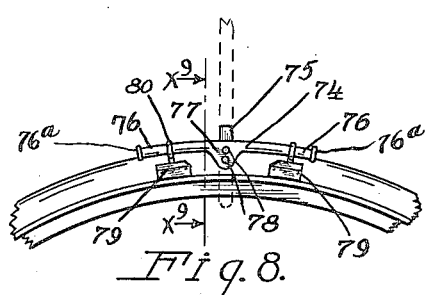
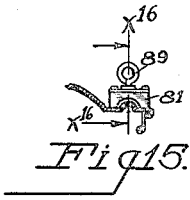
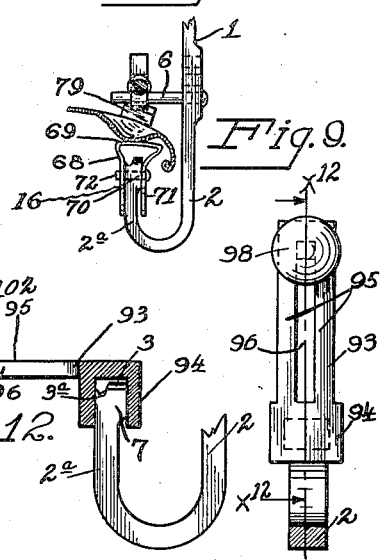
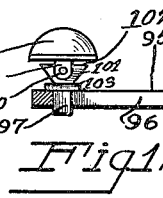
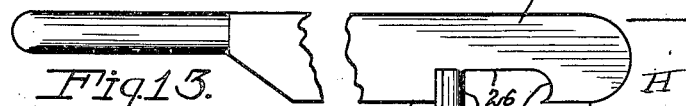
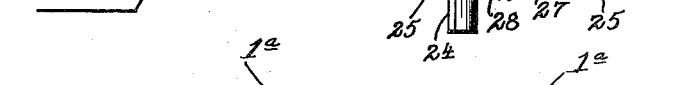
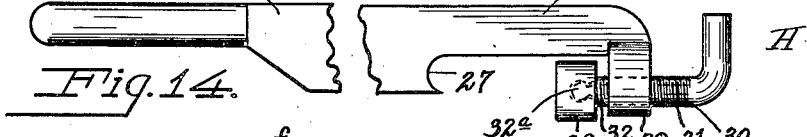
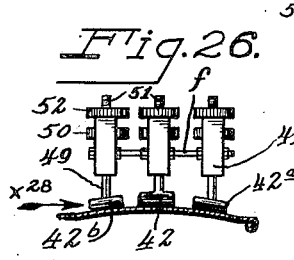
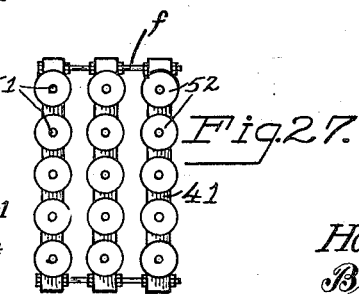
Inventor,
Homer R. Kennedy;
By Raymond Ives Blakeslee
Attorney.

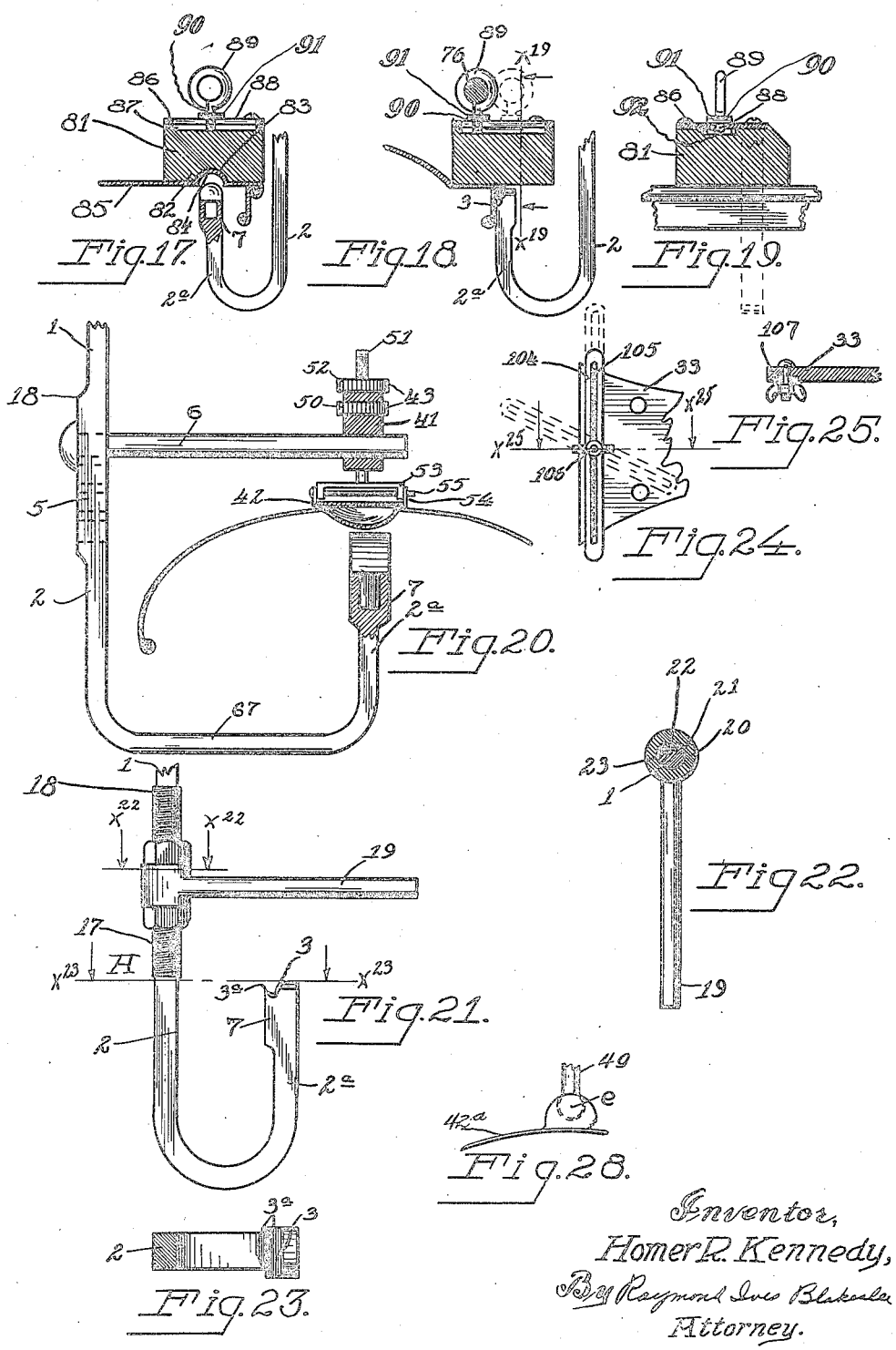

UNITED STATES PATENT OFFICE.

HOMER R. KENNEDY, OF LOS ANGELES, CALIFORNIA, ASSIGNOR TO GUSSIE M. KENNEDY, OF LOS ANGELES, CALIFORNIA.

FENDER RIM AND WIRED-EDGE TOOL AND THE LIKE.

1,427,299.    Specification of Letters Patent.    Patented Aug. 29, 1922.

Application filed March 4, 1920. Serial No. 363,196.

*To all whom it may concern:*

Be it known that I, HOMER R. KENNEDY, a citizen of the United States, residing at Los Angeles, in the county of Los Angeles and State of California, have invented new and useful Improvements in Fender Rim and Wired-Edge Tools and the like, of which the following is a specification.

This invention relates to improvements in fender rim and wired edge tools and the like, and has for its object to provide a new and simple and effective means whereby a fender which has been damaged may have its various parts restored to a normal condition, such as re-folding and crimping the sheet metal edge around the wire edge of the fender rim, and at the same time removing any kinks or irregularities incident to the wire, as well as re-shaping the general contour of the fender, the rim or wired edge.

In practicing the invention I provide means that may perform the above object at a great saving of time over any known present method, and requiring no particular skill in accomplishing the results desired.

The invention consists in the novel and useful, expeditious, economical and efficient method in restoring a fender to a normal condition, as disclosed more in detail in the drawings, all as hereinafter pointed out in claims. Other objects than the one above mentioned, will readily suggest themselves.

In the drawings:

Figure 1 is a fragmentary perspective view of a fender, the top surface, the wire edge and rim of which are shown as indented;

Figure 2 is a vertical elevation of a sheet metal tool cooperating with a forming shoe, engaging the wire edge of a fender, certain parts being shown in section, and the entire device taken on the line $x^2$—$x^2$, Figure 3, and looking in the direction of the appended arrow.

Figure 3 is a fragmentary vertical elevation of the device shown in Figure 2;

Figure 4 is a fragmentary longitudinal side view of the sheet metal tool shown as cooperating with a die and block between which is disposed the rim of a fender, the fender being shown in section;

Figure 5 is a fragmentary top plan view of the device shown in Figure 4;

Figure 6 is a fragmentary side elevation of a sheet metal tool showing a returned end portion of same mortised to receive a tenon to which is attached, in this case, a bifurcated arm accompanying a wheel journaled between said bifurcations, the wheel being grooved on the periphery;

Figure 7 and Figure 7ª are plan views of pressure blocks used in cooperation with the sheet metal working tool;

Figure 8 is a fragmentary vertical side elevation of a pressure bar with its attendant pressure feet in cooperation with the sheet metal working tool;

Figure 9 is a transverse sectional view, taken on the line $x^9$—$x^9$, Figure 8, and looking in the direction of the appended arrows;

Figure 10 is a side elevation of a stake head;

Figure 11 is a fragmentary side elevation of a sheet metal tool having a returned end portion, which is mortised to accommodate the stake head tenon as shown by the cross section of same;

Figure 12 is a fragmentary side elevation shown partly in section, of an attachment utilizing a stake head in cooperation with a sheet metal tool, and taken on the line $x^{12}$—$x^{12}$, Figure 12ᴬ;

Figure 12ᴬ is a detail top plan of the attachment shown in Figure 12;

Figure 13 is a fragmentary plan view of a modification of the sheet metal tool;

Figure 14 is a fragmentary plan view of a further modification of a sheet metal tool;

Figure 15 is a fragmentary end elevation of a pressure foot in cooperation with a beaded portion of a fender;

Figure 16 is an end elevation shown partly in section of the device shown in Figure 15, and taken on the line $x^{16}$—$x^{16}$ Figure 15;

Figure 17 is a fragmentary side elevation showing the pressure foot in cooperation with the body portion of a fender, as well as a sheet metal tool having a stake head provided with a tenon and in the mortised end of the device;

Figure 18 is a fragmentary cross sectional vertical elevation of an adjustable pressure foot in cooperation with the fender and sheet metal tool;

Figure 19 is a fragmentary cross sectional and elevation of the device shown in Figure 18, and taken on the line $x^{19}$—$x^{19}$, and looking in the direction of the appended arrows;

Figure 20 is a fragmentary side elevation, certain features being shown in section, of a sheet metal tool provided with a returned end portion which is mortised to accommodate various shapes of stake heads having tenons to fit in said mortised portion, and an adjustable forming shoe, the forming shoe and stake head being shown in engagement on the peripheral surface of the fender;

Figure 21 is a fragmentary side elevation of a sheet metal tool showing certain features which are capable of adjustment;

Figure 22 is a top plan view shown partly in section, of certain parts of the device shown in Figure 21, and taken on the line $x^{22}$—$x^{22}$, and looking in the direction of the appended arrows;

Figure 23 is a top plan view shown partly in section, of a sheet metal tool, and taken on the line $x^{23}$—$x^{23}$, Figure 21;

Figure 24 is a fragmentary top plan of a pressure block similar to that shown in Figure 7, with the exception that the end guides are slotted to receive a bolt and nut whereby the guides may be adjusted on the block to any desired position;

Figure 25 is a fragmentary cross sectional view of the device shown in Figure 24, and taken on the line $x^{25}$—$x^{26}$;

Figure 26 is an end elevation, certain parts being shown in section, of a plurality of adjustable forming shoes arranged on the peripheral surface of a fender; said forming shoe being in detail similar to that shown in Figures 2 and 3;

Figure 27 is a top plan of the device shown in Figure 26; and,

Figure 28 is a fragmentary sectional view showing certain details of construction of the forming shoe, and taken on the line $x^{28}$, Figure 26.

Corresponding parts in all the figures are designated by the same reference characters.

Referring particularly to the drawings, A designates a sheet metal tool of which 1 is a long lever arm and 2 a short lever arm, the line of demarcation between the two lever arms being a part, as 4, where a stud or pin 6 passes laterally through any one of a series of vertically disposed transverse perforations 5.

The arm 2 extends downwardly for a portion, then is spacedly returned or hooked for a distance as at $2^a$. An end or head portion 7 of the arm $2^a$ is enlarged and presents a surface which is arcuated both transversely and laterally, with a portion as 3 provided with a semi-annular or arcuated groove, the outer edge of which as $3^a$ is longitudinally thin along one side and sunk below the level of the top of the head portion 7. The enlarged head is likewise provided with a lateral perforation or perforations 16 which may accommodate pins, bolts, and accessory objects joined to same. The end portion of the arm 1 is provided with a grip or handle means 12.

Obviously the work to be performed depends upon the length of the arm 1, and the distance 11 shown by dotted line between the head 7 and the fulcrumed point, which, in this case, would be about the stud 6. Thus a change in location of the stud or pin 6 from one perforation 5 to another would tend to shorten or lengthen the lever arm 11 existing between the point of contact 3 with any cooperating object and any other object such as a forming block or shoe, to be described later, mounted upon or supported by the stud 6. Likewise the thickness of any cooperating object is readily compensated for by the adjustment of the pin or stud 6, allowing the tool A to work freely.

Figure 11 shows the returned end portion of the sheet metal tool A mortised as at 13 to accommodate a tenon 14 integrally formed with a stake head 15, which stake head, in this case, is in all particulars similar in form to the operative end or head 7 of the device shown in Figures 2 and 3, with the exception that in the last figures named the head 7 is integrally formed with the arm $2^a$.

Figure 6 shows a form of stake head $b$ provided with bifurcated portions 8 terminating at a point to form a tenon $14^a$, which tenon fits into the mortised portion 13 of the head 7. Between the bifurcations 8 is a wheel 9 rotatably journaled on the shaft $c$. The wheel 9 is grooved on the periphery as at 10.

The wheel 9 performs the same function as the grooved portion 3 in the device shown in Figures 2 and 3. Obviously by providing the head 7 with a mortised portion so that different devices may be fitted thereto, the tool is readily made more accessible to various uses, depending on the functions to be performed.

The modification of the sheet metal working tool A shown in Figures 21 and 22 includes a threaded portion 17 upon the arm 1 and disposed at the part 18. A pin or stud 19 is provided with a bossed or enlarged head 20 provided with a perforated part 21, the interior surface of which has an inwardly directed portion 22, which portion cooperates with a channeled portion 23, located in the lever arm 1 at the portion designated as 18. The channeled portion 23 runs the entire length of the threaded portion so that the pin or stud 19 is always in the same plane as the returned end portion $2^a$ and the lever arm 1 of the sheet metal tool A.

A modification of the tool A is shown in Figure 13 in which the arm $1^a$ has a portion of one longitudinal edge as 25 sunken at 26 to form a spanner having two fixed jaw portions 27 and 28. The jaw portion 27 presents a concave inner surface the width of the arm 1ª, while the jaw 28 presents an outwardly broadened depending portion having a laterally arcuated surface in contour. This tool may be put to certain uses, as the tool shown in Figures 2 and 3,—the jaw 27 corresponding to the head 7 with its groove 3, while the jaw 28 would represent a stake head or forming shoe.

In Figure 14 the tool is in all particulars similar to Figure 13, with the exception that the relative positions of the jaws 27 and 28 have changed places and the jaw 28 so arranged that the span between it and the jaw 27 may be increased or decreased at will. The tool includes the lever arm 1ª having an enlarged end portion 29 which has a transverse threaded portion to accommodate an adjusting bolt 30 correspondingly threaded as at 31. Upon the one end of this bolt as at 32 there is provided a universal joint 32ª for connecting with the jaw 28, so that when the bolt is rotated the arcuated face of the jaw is always maintained in the same position upon any object that it may press against.

The tool shown in Figures 13 and 14 may be cast or stamped from suitable material in a minimum of time and at a minimum expense and is not intended to cover as wide a field as the form of tool shown in Figures 2 and 3.

Cooperating at all times with the metal working tool A are certain attendant features such as the pressure blocks shown in Figures 7 and 7ª. A block 33 is provided with a plurality of transverse perforations 34 for engagement with the pin 6, and this block 33 is likewise provided with concaved surfaces 35 for engaging with the arcuated surface of a fender. The concaved surfaces 35 may be beveled to provide for any incline upon the fender. At each end and on one side of the block 33 there are provided guides 36, the end portions of which as at 37 extend beyond the arcuated surfaces 35. The end portions 37 enable the block 33 to at all times be in alignment with the edge portion of the fender as it travels along and performs its function in cooperation with the lever arm 1. The perforations 34 are arranged at alternate parts of the block 33 for the purpose of readily providing an adjustment as to height and distance, etc., of the work to be performed upon the fender.

In Figure 7ª a block 38 is in all respects similar in details to the block 33, but shows the longitudinal edge portions as at 39 and 40 different in shape or contour, the edge 39 being straight and the edge 40 convex. Most fenders used today, such as fenders for automobiles, have a crown portion convex in form, and a returned curved portion which is concave. The block shown in Figure 7 will work on the convex portion of the fender and the block shown in Figure 7ª will operate most readily upon the returned or concaved or flat portions.

A modification of the guides 36 shown in Figures 7 and 7ª is illustrated in Figures 24 and 25, in which guides 104 are longitudinally slotted as at 105 to accommodate an adjustment bolt and screw 106 mounted upon the block 33. The block 33 is likewise grooved as at 107 so that the guide 104 when extending laterally across the block 33 may fit within said groove 107. The dotted lines illustrate various positions that may be assumed by the guides 104, depending upon the uses to which the block is to be put.

An adjustable forming shoe is shown in Figures 2 and 3 and includes a body portion 41, an adjustable forming foot 42 and means 43 for locking said foot 42 in any desired position.

The body 41 may be provided with a longitudinal recessed portion 44, and likewise provided with perforations 45 extending between a base 46 and top 47 of the body 41, and is also provided with a plurality of perforations 48 extending laterally from side to side of the body 41 and used to accommodate the stud or pin 6. Situated within the recessed or slotted portion 44 and in engagement with adjustable bolts 49 which pass through the perforations 45, are the means 43 which include adjusting nuts 50, and locking nuts 52, both of which are interiorly threaded to engage threaded portions 51 on each of the bolts 49. The locking nuts 52 are mounted on the top surface 47 to prevent any movement of the bolts 49. The bolts 49 are likewise provided with bifurcated arms 53 which engage with stirrup portions 54 of the forming shoe 42. The stirrup portions 54 and the bifurcated arms 53 are held in relation to one another by means of a pin 55. It is obvious that the shoe 42 may be changed in general contour to suit any form of fender, that is, the means 43 may be so adjusted that a portion of the shoe to the right side of the fulcrum or pin 6 may have a convex surface while the portion to the left of the pin 6 is concave in contour. Thus this shoe can readily work upon a flat, convex or concave portion of the fender, and does away with the necessity of having a multiplicity of forming blocks having various curved portions as shown in Figures 7, and 7ª, and elsewhere in the drawings.

At times it may be found advantageous to supply a forming shoe that may more completely cover the top portion of the fender, as shown in Figures 26 and 27. In this case a series of forming shoes 42 are provided, the two outer ones as 42ª and 42ᵇ having one end of the bolts 49 provided with a ball to fit into a socket *e* arranged within the shoes, as illustrated in Figure 28, while the median or center shoe 42 is in all details similar to the shoe illustrated in Figure 2. Bracing means *f* join the housing members of the adjustable forming shoes. It will be seen that each shoe can be arranged both laterally and longitudinally to correspond with the curvature of any fender, and indentations may be readily removed by a proper adjustment of each forming shoe when used in conjunction with the tool A.

The rim die 56 shown in Figures 4 and 5 includes a base portion 57 which is longitudinally slotted for a portion, as at 58, and has a bent-up portion 59, the elbow of which as at 60 is arcuated and relieved so that the crimped wire portion 61 of the fender rim may float within said relieved portion. As shown in Figure 5, a pressure block 62 having an aperture 63 passing laterally through same, accommodates the pin or stud 6, which in turn slides within the slotted portion 58 of the rim die 56 and into one of the perforations 5 of the lever arm 1. Referring both to Figures 4 and 5 in which the rim 64 of the fender is engaged between the block 62 and the die 56, the block 62 presents an arcuated top surface 65 similar to the arcuated end surface of the fender edge 66. The die 56 having a slotted base is free to move so as to grip the rim 64 against the block 62 and press out any indentation. Referring to Figure 5 and to the dotted lines, it will be observed that an upward or downward as well as a back and forth motion of the lever arm 1 tends to cause the rim 64 to be moved inwardly or outwardly at the will of the operator, thus straightening the rim and pressing out any indentations.

The device as shown in Figure 20 is in all details similar to that shown in Figures 2 and 3, with the exception that the returned portion is extended laterally as at 67 so that the forming shoe as well as the stake head provided with a tenon may be placed upon the fender at any desired point, and any indentation removed therefrom. Obviously it would not be necessary to use the particular forming shoe illustrated, but a pressure foot or pressure block or stake head as illustrated in other figures, might as readily be used. The stake head 68 illustrated in Figures 9 and 10 includes an arcuated head portion 69 and two side portions 70 and 71 in the form of a stirrup and which stirrup is for the purpose of straddling the enlarged head 7 and being held to same by a suitable pin 72 passing through any one of a series of perforations 73 extending laterally through the head 68, as well as the perforations 16 in the head 7.

Referring to Figure 8, I provide a pressure bar 74 having a central portion and an extended tenon 75. The pressure bar has two lateral extensions 76, the ends of which as 76ᵃ are bossed. An enlarged re-inforcing portion 77, is provided with a series of vertically arranged perforations 78 extending laterally therethrough. Upon each of the lateral extensions 76 is disposed pressure feet 79 which have within their top surfaces guiding means or eye bolts 80 which loosely surround the extension 76 so that the pressure feet may be moved along said extension to any desired point. A similar form of pressure bar as well as the pressure feet, are fully described in my U. S. Letters Patent No. 1,316,451 issued September 16, 1919, for sheet metal tool.

Referring to Figure 9, it will be observed that the pressure bar 74 is joined to the lever arm 1 by means of the stud or pin 6 passing through one of the perforations 78, and that the stake head 68 and the pressure feet 79 are in a direct line or in the same plane with each other when it is desired to remove any indentation or irregularity in the fender. These indentations obviously are removed by a direct rocking motion of the lever arm 1.

Referring to Figures 15, 16, 17, 18 and 19, all of which illustrate the same type of pressure foot, with the exception that the general contour of the bottom surface which engages the work, they all vary, as illustrated. The pressure foot 81 shown in Figure 17, has the bottom surface 82 concave, as at 83, to accommodate within said concavity a convex bead 84 located on the rim of the fender 85. As shown at 86, a portion near the top of said pressure foot 81 is laterally slotted as at 87 and the top surface of the pressure foot 81 as at 88, is likewise laterally slotted and communicates with the inner recess or slotted portion 87. An eye bolt 89 provided with a portion in the form of an H section 90 has its lateral projections 91 and 92 sufficiently spaced so that the projection 91 rides on the top surface of the pressure foot 81, and the projection 92 rides within the slotted portion 86. As illustrated in Figures 17, 18 and 19, the projections 91 and 92 are of a width corresponding with the width of the slot 88, so that the pressure foot 81 may be turned in relation to the eye 89 and the projections 91 and 92 removed from the recess 86. This of course makes the various pressure feet interchangeable and various forms may be readily attached to the H portion 90 depending upon the work to which it is to be applied.

In Figure 18 it will be observed that the eye 89 and the pressure bar 76, as well as the grooved head 7 so cooperate with one another when working, as to have their centers of resultant pressures in a line; this of course producing maximum results. The other pressure foot located upon one of the arms 76 could of course be placed in any desired position in order to secure an additional bearing surface.

Referring to Figure 12, an extension 93 is provided with a mortised end 94 which end engages and closely fits the enlarged head 7 of the lever arm 2ª. An arm 95 of the extension 93 is longitudinally slotted as at 96 and said slot has engaged therein a tenon 97 to which is attached a stake head 98, which is provided with opposite portions 99 pivotally held as at 100 to a block 101 in the form of a frustum of a regular pyramid, the little base 103 of which is attached to a plate which straddles the recess 96 and engages with the tenon 97, while the large base portion 102 acts as a buffer or stop for any lateral rocking motion, so as to permit and limit the amount of motion that the stake head 98 may acquire when performing work.

As before mentioned the enlarged head 7 on the returned portion 2ª of the lever arm is so made that the ends of same, as at 3, are both transversely and laterally arcuated; thus if a stake head is not used, the rounded head coming into engagement with the fender, will readily perform the function of a stake head. Stake heads are really auxiliary to this main feature, and only provide separate and distinct devices for aiding in the work to be performed.

It is obvious that many changes and variations and modifications may be made in departure from the particular description and showing of the accompanying drawings, in adapting the invention to varying conditions and requirements of use and service, without, however, departing from the true spirit of the invention.

Having thus disclosed my invention, I claim and desire to secure by Letters Patent:

1. In a device of the character described, the combination of means for engaging the wired edge of a fender, and means for engaging the top surface of the fender cooperating with said first named means, whereby by a manual operation of the device kinks are removed and the metal re-crimped about the wire of the wired edge and indentations removed from the surface of the fender; said first named means including a lever arm having an edge-gripping returned end portion, and said second named means including a pressure block.

2. In a device of the character described, the combination of means for engaging the wired edge of a fender, and means for engaging the top surface of the fender cooperating with said first named means, whereby by a manual operation of the device kinks are removed and the metal re-crimped about the wire of the wired edge and indentations removed from the surface of the fender; said first named means including a lever arm having an edge-gripping returned end portion, and said second named means including a pressure block, the longitudinal edges of which are curved.

3. A sheet metal tool, including a lever arm having a returned end portion, the head of which is enlarged and rounded and provided with a curved groove, the outer edge bounding the grooved portion being longitudinally thin along one side, and a pressure block having a plurality of transverse perforations through the faces of same, there being means joining the lever arm and the pressure block.

4. A sheet metal tool, including a lever arm having a returned end portion, the head of which is enlarged and rounded and provided with a curved groove, the outer edge bounding the grooved portion being longitudinally thin along one side, and a pressure block having a plurality of transverse perforations through the faces of same, there being means joining the lever arm and the pressure block; said means passing through one of the perforations in the pressure block.

5. A sheet metal tool, including a lever arm having a spacedly returned end portion the head of which is enlarged and rounded and provided with a curved groove adjacent one lateral edge, said lateral edge being longitudinally thin and sunk below the end surface level of the head, said lever arm having a series of vertically disposed transverse perforations, a pressure block and means passing through said perforations and joining the pressure block.

6. A sheet metal tool, including a lever arm having a spacedly returned end portion the head of which is enlarged and rounded and provided with a curved groove adjacent one lateral edge, said lateral edge being longitudinally thin and sunk below the end surface level of the head, said lever arm having a series of vertically disposed transverse perforations, a pressure block and means passing through said perforations and joining the pressure block; said means including a stud bolt.

7. A sheet metal tool, including a lever arm having a spacedly returned end portion the head of which is enlarged and rounded and provided with a curved groove adjacent one lateral edge, said lateral edge being longitudinally thin and sunk below the end surface level of the head, said lever arm having a series of vertically disposed transverse perforations, a pressure block having a plurality of transverse perforations through the faces of same, and a stud bolt passing laterally through a perforation in the lever arm and engaging a perforation in the pressure block.

8. A sheet metal tool, including a lever arm, said lever arm having a returned end portion, the head of which is mortised, a stake head provided with a complementary tenon accommodated within said mortised head, said stake head having an enlarged and curved work presenting surface, which is provided with a curved groove adjacent an edge, said edge being longitudinally thin, whereby when the grooved portion co-acts with the metal edge around the wired edge of a fender same is re-crimped so as to reinfold the wire.

9. A sheet metal tool, including a lever arm, said lever arm having a returned end portion, the head of which is mortised, a stake head provided with a complementary tenon accommodated within said mortised head, said stake head having an enlarged and curved work presenting surface which is provided with a curved groove adjacent an edge, said edge being longitudinally thin and sunk below the end surface level; said lever arm having a series of vertically disposed transverse perforations, a pressure block and means passing through said perforations and joining the pressure block.

10. A sheet metal tool, including means for engaging a portion of a fender, means engaging another portion of the fender, and means for adjustably maintaining said first and said second named means in relation to one another, whereby a movement of said last named means will cause said first and said second named means to actively engage the fender, removing indentations and bent parts and restoring same to a normal condition; said second named means including an adjustable forming shoe for engaging with the work.

11. A sheet metal tool, including a lever arm having a spacedly returned end portion the head of which is enlarged and rounded and provided with a curved groove adjacent one lateral edge, said lateral edge being longitudinally thin and sunk below the end surface level of the head, said lever arm being threaded for a portion, a pressure block, and means adjustably connected with said threaded portion of the lever arm and joining the pressure block.

12. A sheet metal tool, including a lever arm provided with a part adapted to engage a fender; there being an adjustable forming shoe member adapted to engage another part of said fender, and means carried by the lever arm for adjustably and detachably engaging the forming shoe member; said forming shoe member including a body portion provided with a plurality of transverse perforations, and the said means carried by the lever arm and engaging the forming shoe member comprising a bolt adapted to be received within a perforation in the body of the forming shoe member.

13. A sheet metal tool, including a lever arm provided with a part adapted to engage a fender; there being an adjustable forming shoe member adapted to engage another part of said fender, and means carried by the lever arm for adjustably and detachably engaging the forming shoe member; said forming shoe member comprising a body portion, members carried by said body portion and a flexible member adjustably carried by said last named members.

14. A sheet metal tool, including a lever arm provided with a part adapted to engage a fender; there being an adjustable forming shoe member adapted to engage another part of said fender, and means carried by the lever arm for adjustably and detachably engaging the forming shoe; said forming shoe member comprising a body portion, members carried by said body portion and a flexible member adjustably carried by said last named members; there being means for adjusting the flexible member to conform to work of different shapes.

15. In a sheet metal tool adapted to co-act with the wired edge of a fender to re-crimp the same so as to reinfold the wire thereof, the combination, of a lever arm, a hooked end for said arm, said hooked end being formed with a head which is provided with a curved groove adjacent one lateral edge; said grooved portion of the head being adapted to co-act with the wired edge of the fender so as to re-crimp and straighten the same and reinfold the wire when the lever arm is operated.

In testimony whereof, I have signed my name to this specification in the presence of two subscribing witnesses.

HOMER R. KENNEDY.

Witnesses:
　MILDRED LEACH,
　J. CALVIN BROWN.